(12) United States Patent
Ueda et al.

(10) Patent No.: US 6,611,302 B1
(45) Date of Patent: Aug. 26, 2003

(54) FLAT PANEL DISPLAY DEVICE

(75) Inventors: Shoichi Ueda, Tokyo (JP); Yoshinobu Sakaki, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 331 days.

(21) Appl. No.: 09/613,463

(22) Filed: Jul. 10, 2000

(30) Foreign Application Priority Data

Jul. 14, 1999 (JP) ............................................ 11-201020

(51) Int. Cl.⁷ ............................................ G02F 1/1333
(52) U.S. Cl. ............................................ 349/58; 349/59
(58) Field of Search ..................... 349/58, 59

(56) References Cited

U.S. PATENT DOCUMENTS

| | | | |
|---|---|---|---|
| 4,862,153 A | * 8/1989 | Nakatani et al. | ............ 313/511 |
| 5,497,296 A | 3/1996 | Satou et al. | |
| 5,499,129 A | 3/1996 | Satou et al. | |
| 5,504,648 A | 4/1996 | Honda et al. | |
| 5,507,661 A | 4/1996 | Honda et al. | |
| 5,526,227 A | 6/1996 | Satou et al. | |
| 5,544,007 A | 8/1996 | Inoue | |
| 5,986,726 A | * 11/1999 | Murai | .......................... 349/58 |

FOREIGN PATENT DOCUMENTS

| | | |
|---|---|---|
| JP | 53-065766 | 6/1978 |
| JP | 09-311319 | 12/1997 |
| JP | 11-95681 | 4/1999 |
| KR | 93-9364 | 5/1993 |
| KR | 1997-0066663 | 10/1997 |

OTHER PUBLICATIONS

Korean Office Acfion dated Apr. 30, 2002, with partial English translation.
Japanese Office Action dated Nov. 26, 2002 with partial English translation.
Taiwanese Office Action dated Feb. 20, 2003 with partial English translation.

* cited by examiner

*Primary Examiner*—Toan Ton
*Assistant Examiner*—P. R. Akkapeddi
(74) *Attorney, Agent, or Firm*—McGinn & Gibb, PLLC

(57) ABSTRACT

A taper 31 is formed in a holding wall 15 in a holding frame 11 for holding the periphery of a flat display panel 2 such as a liquid crystal panel so as to be apart from the display panel 2 from the lower side of the boundary face between substrates 4 and 5 to the upper end. On the substrate 4 side lower than the boundary of the substrates 4 and 5, a holding face 15a which comes into contact with only the end face of the lower substrate 4 is provided.

15 Claims, 10 Drawing Sheets

FLAT PANEL DISPLAY DEVICE

BACKGROUND OF THE INVENTION

1. Field of the Invention

The present invention relates to a flat panel display device such as a liquid crystal display device and, more particularly, to a structure of supporting a flat display panel.

2. Description of the Prior Art

In recent years, as a device is becoming smaller, lighter, and thinner, a flat panel type electron display device (hereinbelow, called a flat panel display device) typified by a liquid crystal display device for use in various devices is also becoming thinner. The structure of supporting the flat display panel is also devised accordingly.

A conventional example of a liquid crystal display device having a backlight will be described herein below as an example of the flat panel display device.

As shown in FIG. 1, a conventional liquid crystal display device 1 comprises a rectangular liquid crystal panel 2 and a rectangular light guide plate 3 for backlight provided on the under face side of the liquid crystal panel 2. The liquid crystal panel 2 comprises substrate members 4 and 5 such as a pair of glass substrates, which are opposed to each other. Outer surfaces of the substrates 4 and 5 are provided with polarizers 6. The lower substrate 4 is provided with a matrix array of thin film transistors and thus which is called a TFT substrate to have a shutter function of controlling light from the light guide plate 3. The upper substrate 5 is provided with color filters (CF) of three primary colors for color display and thus which is called a CF substrate.

The liquid crystal panel 2 and the light guide plate 3 are laminated together with an inner holding frame 11 inserted therebetween. This laminated structure is housed in a container formed with a pair of outer holding frames 16 and 17. Each of the inner frame 11 and the outer frames 16 and 17 is made of a synthetic resin and formed in a rectangular frame shape.

On the inner holding frame 11, a holding wall 15 is formed in the circumferential direction. The liquid crystal panel 2 is disposed within the holding wall 15 such that end surfaces of the liquid crystal panel 2 are opposed to a holding face 15a of the holding wall 15.

A holding recess 12 is formed in the lower part of the inner holding frame 11. The light guide plate 3 is fit and held in the recess 12. The inner holding frame 11 is provided with a supporting portion or a spacer 13 so as to be interposed in the circumferential direction between the light guide plate 3 and the liquid crystal panel 2. The liquid crystal panel 2 is disposed over the light guide plate 3 via the spacer 13 in a state where the lower substrate 4 is in contact with the spacer 13.

As described above, the outer frames 16 and 17 as upper and lower holding fittings each of which is a frame member having an L shape in cross section are fit to the upper and lower parts of the inner holding frame 11 which holds the liquid crystal panel 2 and the light guide plate 3. By fitting the outer frames 16 and 17, the light guide plate 3 and the liquid crystal panel 2 are integrated with the inner holding frame 11. In such a manner, a liquid crystal display module is obtained.

Such a liquid crystal display module is attached to a casing for display of an information processor.

As shown in FIGS. 2A and 2B, the liquid crystal panel 2 is generally constructed so that two sides in the CF substrate 5 are arranged on the inner side from the end faces of the TFT substrate 4 to expose electrode terminals (not shown) provided along two sides which are orthogonal to each other in the TFT substrate 4. As shown in FIG. 2C, printed circuit boards 23 on which semiconductor ICs for control are mounted and the electrode terminals of the TFT substrate 4 are electrically connected via TCPs (Tape Carrier Packages) 24.

Such a liquid crystal display panel 2 is produced as follows. As shown in FIG. 3A, a panel 2a is prepared by adhering the substrates 4 and 5 having the same outer shapes. Along a predetermined shape (indicated by an alternately long and short dash line 41 in FIG. 3A), as shown in FIG. 3B, a cutting groove 201 is formed in the TFT substrate 4 by a deep penetrating cutter 21. After that, the panel 2a is turned upside down. A predetermined impact is applied to the panel 2a on the side opposite to the cutting groove 201 side by a hammer, thereby breaking only the TFT substrate 4.

Subsequently, as shown in FIG. 3C, a cutting groove is similarly formed in the CF substrate 5 by the deep penetrating cutter 21 along a predetermined shape (indicated by an alternate long and two short dashes line 51 in FIG. 3C). After that, the panel 2a is turned upside down and a predetermined impact is applied to the side opposite to the cutting groove side by a hammer, thereby breaking only the CF substrate 5.

In such a manner, as shown in FIG. 2A, the liquid crystal panel 2 made by the substrates 4 and 5 formed in the predetermined shapes is obtained.

As shown in FIG. 2B, the liquid crystal panel 2 obtained by cutting the outer sides is chamfered by polishing the corners on the surface and back face of the cut faces. In one of the sides in the longitudinal direction and one of the sides in the width direction having electrodes to which the TCPs 24 are connected, the corners on the surface side adhered to the CF substrate 5 of the TFT substrate 4 are also chamfered.

As shown in FIG. 2C, the printed circuit boards 23 are connected via the TCPs 24 to one of the sides in the longitudinal direction and one of the sides in the width direction having electrodes of the chamfered liquid crystal panel 2. After that, the resultant is fit in the holding walls 15 of the holding frame 11.

In the case of manufacturing the liquid crystal panel 2 by cutting the panel 2a in a predetermined outer shape as described above, the substrates 4 and 5 are cut almost in the same outer shape so that the cut faces are flush with each other in each of the other sides in the longitudinal and width directions to which the TCP 24 is not connected. As shown in FIG. 4, however, there is a case such that a deviation of about 0.3 mm at the maximum occurs between the TFT substrate 4 and the CF substrate 5 and a sharp edge 501 of the CF substrate 5 is exposed.

Since the deviation of the edge 501 is very small, chamfering cannot be performed. Consequently, the edge 501 has to be enclosed and held as it is in the holding walls 15 of the holding frame 11.

As shown in FIGS. 5A and 5B, when the liquid crystal panel 2 in which a deviation occurs between the TFT substrate 4 and the CF substrate 5 is supported together with the light guide plate 3 by the holding frame 11 to thereby form the liquid crystal display device 1, on or after attachment of the liquid crystal panel 2 to the holding frame 11, there is a case such that either the edge 401 of the TFT substrate 4 or the edge 501 of the CF substrate 5 which occurs due to the deviation between the substrates 4 and 5 cuts the holding face 15a of the holding wall 15.

When the holding face 15a of the holding wall 15 is cut, the following problem occurs. A dust cut from the holding wall 15 enters between the liquid crystal panel 2 and the light guide plate 3 and partially shields light from the light guide plate 3 and it disturbs display performed by the liquid crystal display device 1. The problem occurs similarly also in a reflection type liquid crystal display device employing a reflector in place of the light guide plate.

Since the holding frame 11 is provided in the thickness direction by the holding walls 15 so as to surround the liquid crystal panel 2, there are problems such that a detaching work of the liquid crystal panel 2 for test, maintenance or replacement is difficult and, moreover, it is very troublesome to attach the liquid crystal panel 2 to the holding frame 11.

Obviously, the problems occur not only in the liquid crystal display panel but also in the other flat panel display devices such as a plasma display device, each having two glass substrates which are disposed so as to face each other.

SUMMARY OF THE INVENTION

It is therefore an object of the invention to provide a flat panel type display device having a holding frame structure in which a holding frame is prevented from being cut by an edge of a flat type display panel such as liquid crystal display panel.

Another object of the invention is to provide a flat panel type display device having a holding frame structure capable of suppressing occurrence of a display failure caused by a dust.

Still another object of the invention is to provide a flat panel type display device having a holding frame structure in which a display panel can be easily attached and detached.

According to the invention, there is provided a flat panel display device comprising: a display panel obtained by disposing a pair of panels so as to face each other; a holding frame for supporting the back side panel in the display panel; and a surface side outer frame which faces the holding frame and supports the surface side panel in the display panel, wherein the holding frame has an end face supporting part and a peripheral supporting part which come into contact with an end face and a peripheral face, respectively, of the back side panel, and the distance between a supporting face upper end of the end face supporting part and a supporting face of the peripheral supporting part in the holding frame is smaller than the thickness of the back side panel.

In such a display device, the end face supporting part has a surface side projection which extends toward the outer frame, and a taper by which the distance between the supporting face upper end and the panel end face is gradually increased toward the outer frame is formed in the surface side projection. Consequently, when the liquid crystal panel is fit in the holding frame, the liquid crystal panel is smoothly guided along the tapers formed in the holding walls and is fit in the holding frame, so that the work of fitting the liquid crystal panel into the holding frame can be facilitated.

The end face supporting part maybe selectively provided. That is, since the end faces of the liquid crystal panel fit in the holding frame can be held by the notches formed in the holding walls, the work of detaching the liquid crystal panel at the time of test, maintenance or replacement of the liquid crystal panel can be facilitated.

In the flat panel display device, the display panel is a liquid crystal display panel and, on the side opposite to the side on which the liquid crystal display panel is supported in the holding frame, light guide plate housing walls for housing a light guide plate for backlight are provided and a back side outer frame for supporting the light guide plate is also provided.

In the flat panel display device, the display panel is a liquid crystal display panel, on the side opposite to the liquid crystal display panel in the holding frame, reflector housing walls for housing a reflector are provided and a back side outer frame for supporting the reflector is provided.

The invention is also characterized in that the area of the back side substrate is larger than that of the surface side substrate. Further, the ridgeline formed between the end face and a face which comes into contact with the periphery supporting part in the back side substrate is chamfered.

According to the invention, the end face supporting part is selectively provided at a corner of the holding frame so that the front end supporting part is apart from a corner of the back side substrate. For example, when notches are formed in the corners of the holding walls, the interference of the corners of the liquid crystal panel with the holding walls can be certainly prevented and the inconvenience caused by the interference of the corners of the liquid crystal panel with the holding walls can be prevented.

Furthermore, at least on one side of the display panel, end faces of the facing substrates are substantially flush with each other.

In the flat panel display device, the outer frame is comprised of a surface side outer frame and a back side outer frame, the surface side outer frame presses the other substrate in the display panel against the holding frame, and the back side outer frame presses the holding frame against the display panel.

According to the invention, there is provided a liquid crystal display device comprising: a light guide plate of a backlight as a plate-shaped light source; a liquid crystal panel having a pair of transmission panel members which are adhered to each other; and a holding frame for holding the peripheries of the light guide plate and the liquid crystal panel so that their faces are arranged in parallel, wherein holding walls which surround the liquid crystal panel are formed in the holding frame and each of the holding walls has a holding face which can come into contact with the end face of only one of the substrate members, on the side of one of the substrate members with respect to the boundary of the substrate members.

As described above, on the side of one of the substrate members with respect to the boundary of the panels, the holding face, which can come into contact with the end face of only one of the substrate members is formed in each of the holding walls surrounding the liquid crystal panel. Consequently, the inconvenience can be certainly prevented such that a dust generated when the edge at the boundary of the substrate members of the liquid crystal panel comes into contact with the holding wall on or after the attachment of the liquid crystal panel and thereby cuts the holding wall enters between the liquid crystal panel and the light guide plate and it causes a problem in display on the screen. Furthermore, since only the holding face can come into contact with only the lower substrate member with respect to the boundary of the panels, an inconvenience such that the edge formed by a deviation between the upper and lower substrate members interferes with the holding wall and cuts the holding wall can be certainly prevented.

DETAILED DESCRIPTION OF THE PREFERRED EMBODIMENTS

Figure 1:
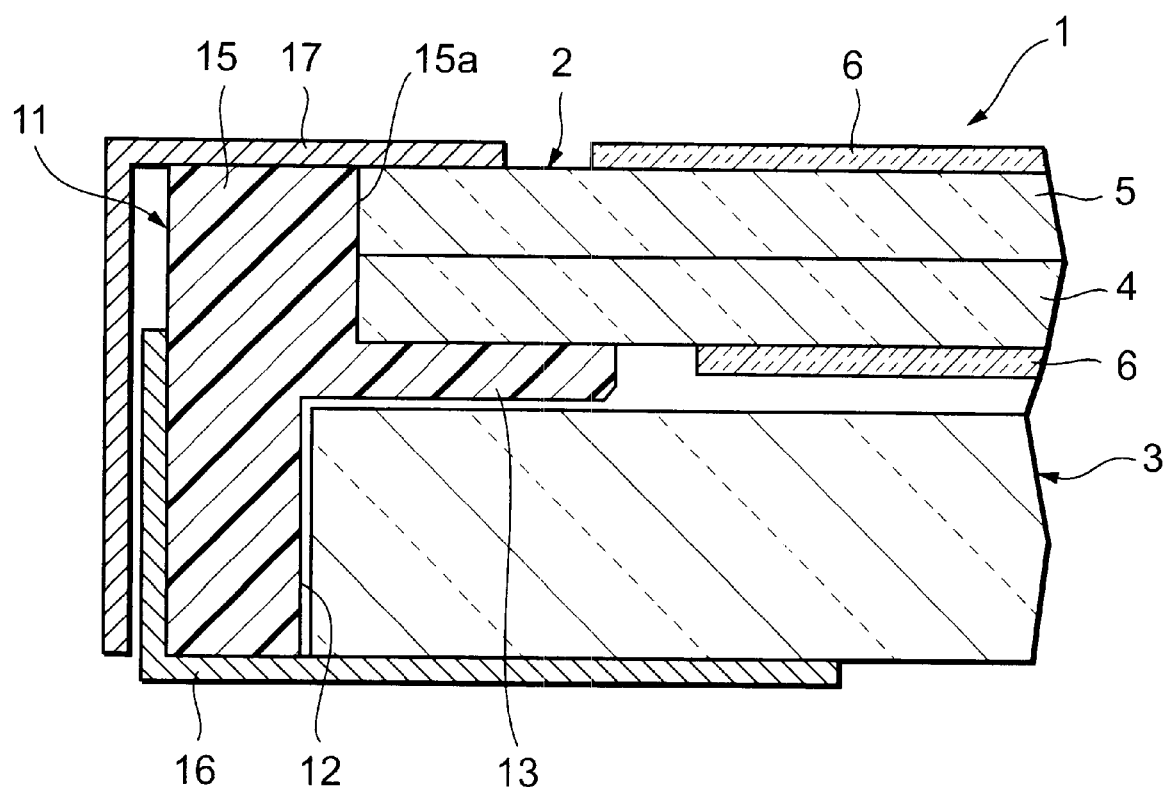
FIG. 1 is a partial cross section of a conventional liquid crystal display device.
Figure 2A:
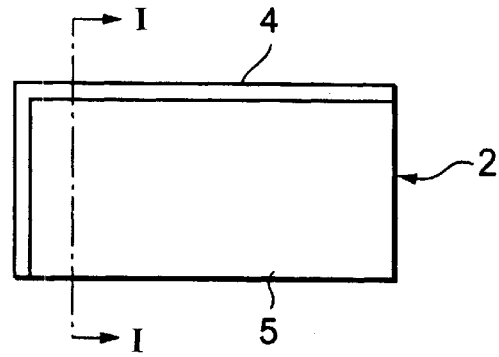
FIG. 2A is a plan view of a liquid crystal panel as a component of the conventional liquid crystal display device.
Figure 2B:
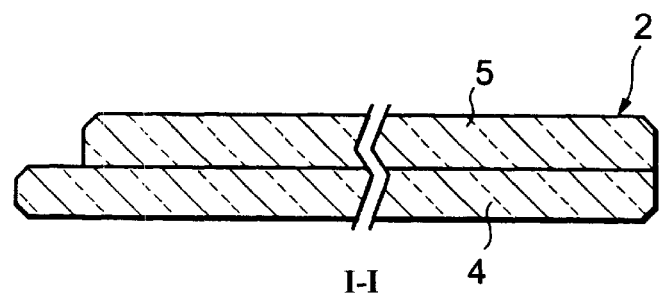
FIG. 2B is an enlarged cross section taken along line I—I of FIG. 2A.
Figure 2C:
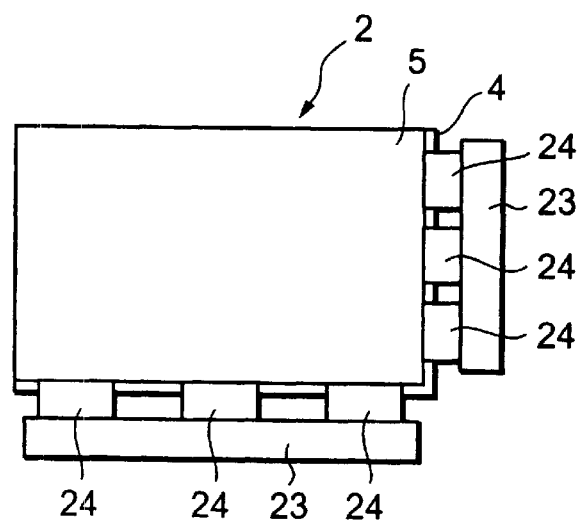
FIG. 2C is a plan view of a liquid crystal panel having a conventional driving circuit.
Figure 3A:
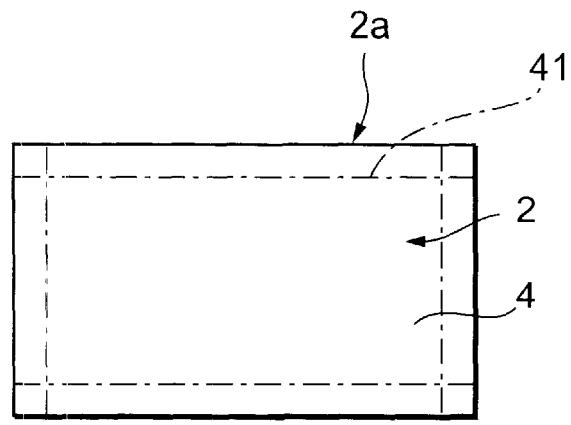
FIG. 3A is a plan view for explaining a process of cutting a TFT substrate in the conventional technique.
Figure 3B:
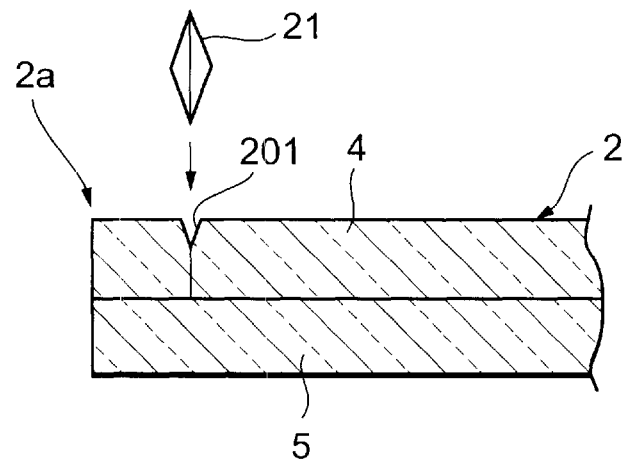
FIG. 3B is a cross section for explaining a panel cutting process in the conventional technique.
Figure 3C:
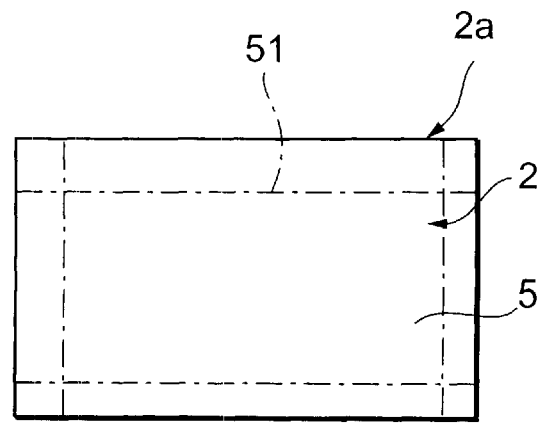
FIG. 3C is a plan view for explaining a process of cutting a CF substrate in the conventional technique.
Figure 4:
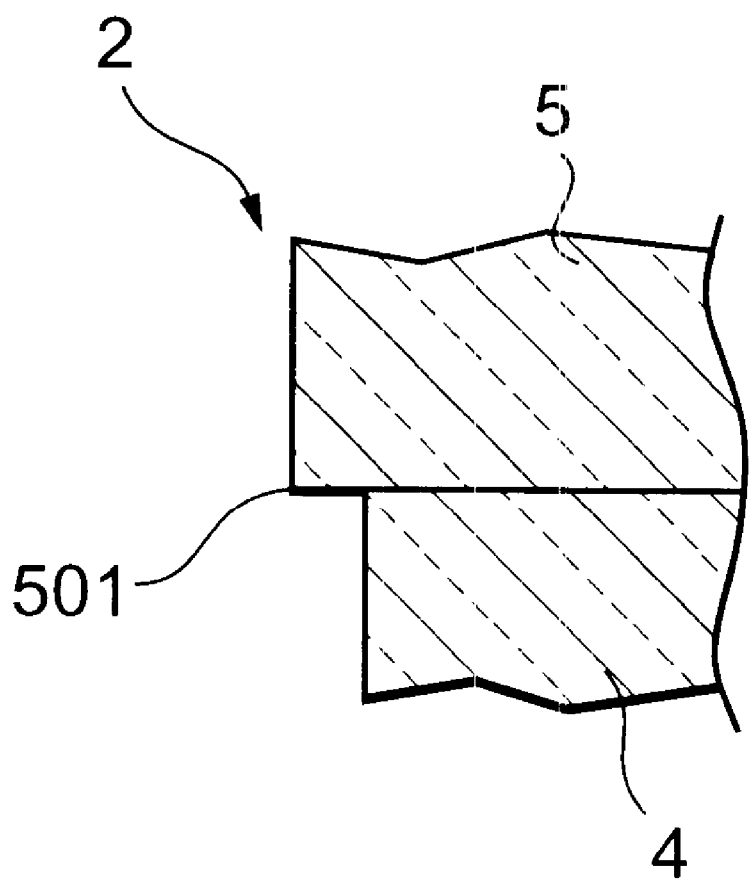
FIG. 4 is an enlarged cross section of an end portion of a liquid crystal panel for explaining a deviation between substrate members in the conventional technique.
Figure 5A:
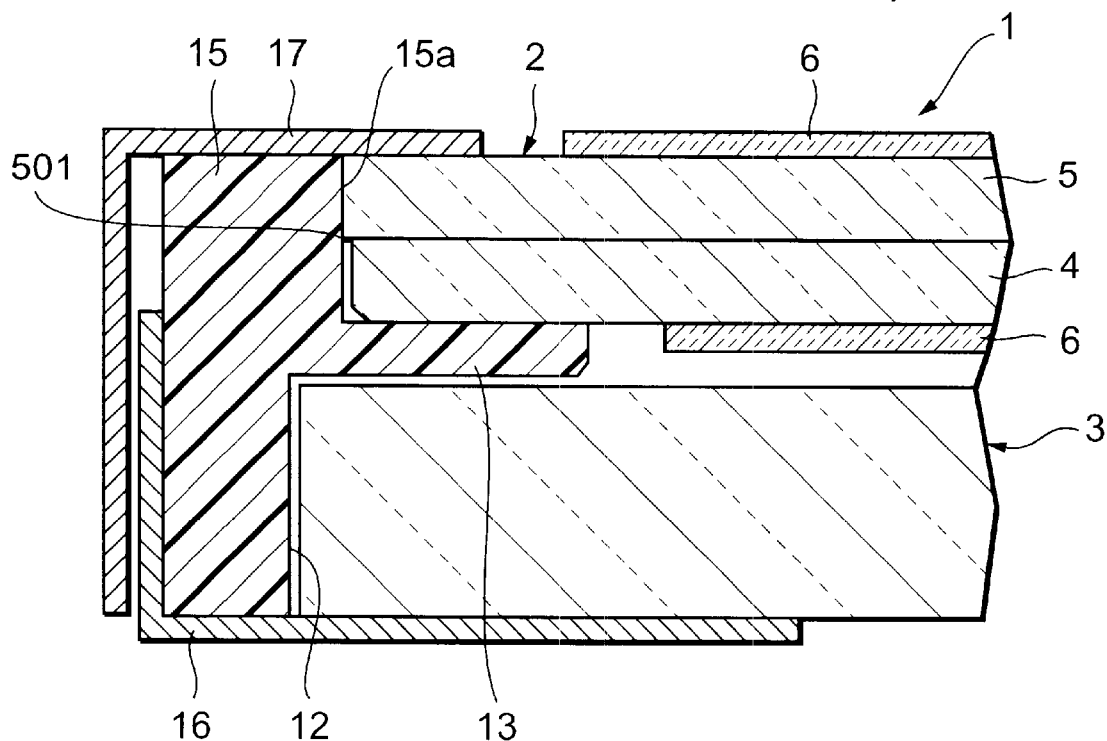
FIGS. 5A and 5B are partial cross sections of a liquid crystal display for explaining a fit state of the liquid crystal panel in the conventional panel.
Figure 5B:
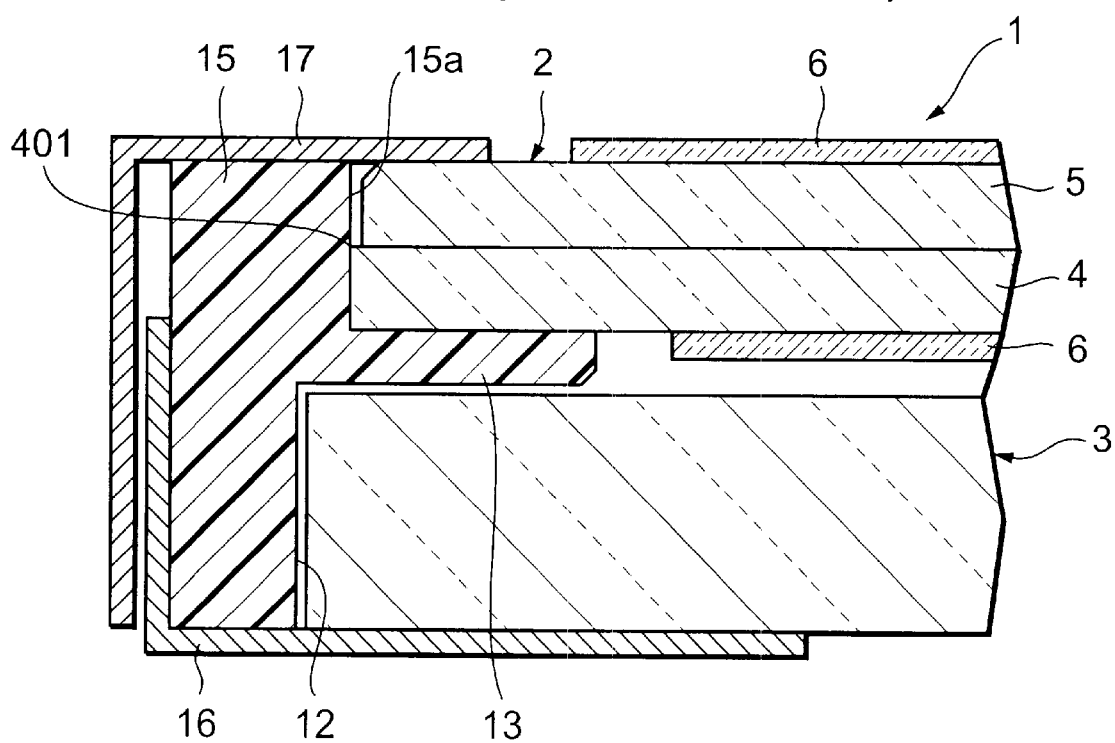

As a display device according to an embodiment of the invention, a transmission liquid crystal display device, which uses a liquid crystal display panel as a display panel and has a light guide member for backlight will be described.

The same components as those in the conventional technique are designated by the same reference numerals and their description is omitted here.

Figure 6:
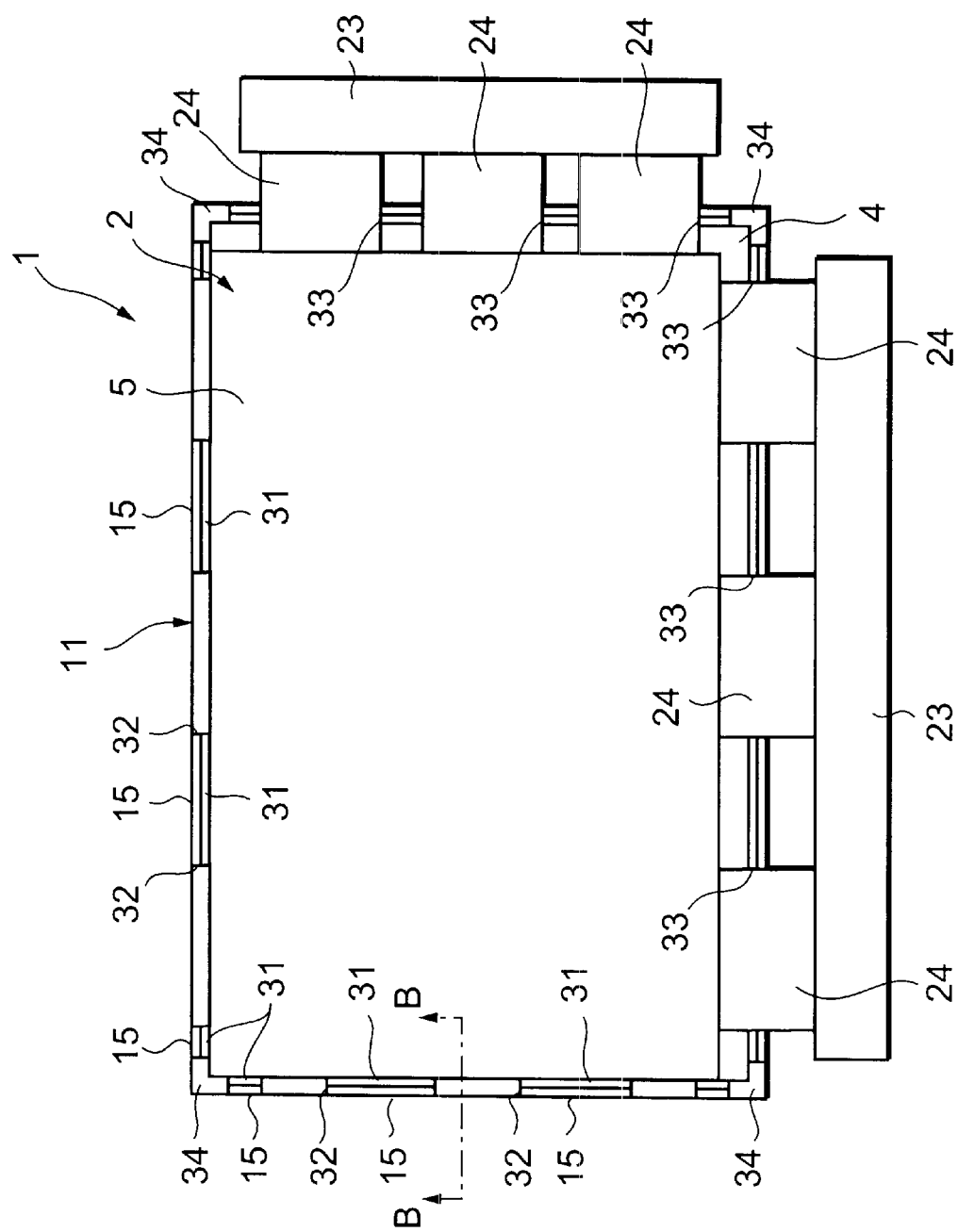
FIG. 6 is a plan view of a liquid crystal display device according to a first embodiment of the invention.
Figure 7:
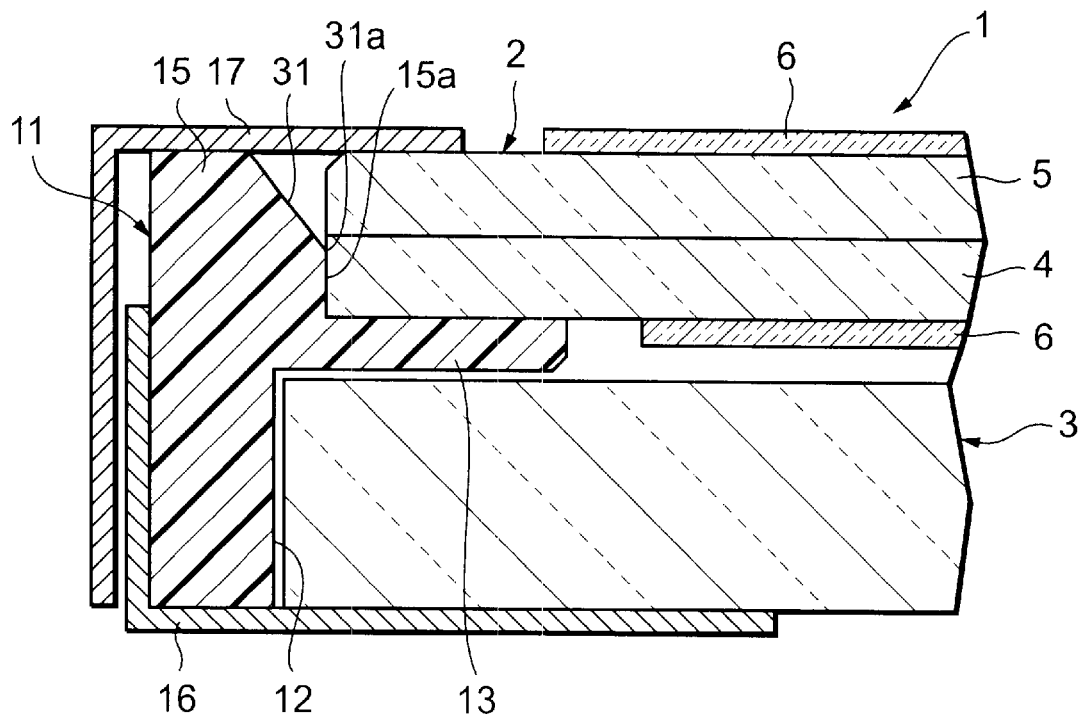
FIG. 7 is a partial cross section taken along line B—B of FIG. 6.

As shown in FIGS. 6 and 7, tapers 31 are formed on the inner sides of the upper part of the holding walls 15 of the inner holding frame 11 as a component of the liquid crystal display device 1 of the embodiment.

The lower periphery 31a of each of the tapers 31 is positioned lower than the boundary faces of the TFT substrate 4 and the CF substrate 5 of the liquid crystal panel 2 which is fit in the inner side of the holding walls 15.

That is, only the end faces of the TFT substrate 4 are in contact with the holding frame 11 and the end faces of the CF substrate 5 are not in contact with the holding frame 11. Consequently, the upper end, that is, the periphery 31a of the holding face 15a of the holding wall 15 is positioned lower than the boundary position of the substrate members 4 and 5. In the case of a liquid crystal display panel, a liquid crystal layer is interposed between the substrates 4 and 5. Consequently, the boundary of the pair of substrates 4 and 5 has a predetermined gap corresponding to the thickness of the liquid crystal layer. The boundary in this case is a face parallel to the inner surface of the TFT substrate 4.

In other words, the height of the holding face 15a is smaller than the thickness of the substrate 4 which is in contact with the holding face 15a. That is, the holding frame 11 has the holding wall 15 and the periphery supporting part 13 serving as end face supporting parts which are in contact with the end face of the back side substrate 4 of the display panel and its peripheral face. The distance between the supporting face upper end 31a of the holding wall 15 as an end face supporting part and the supporting face of the spacer 13 as a periphery supporting part is smaller than the thickness of the rear face side panel, i.e., the TFT substrate 4. The holding face 15a can be therefore in contact with only the end face of the substrate 4.

Figure 8:
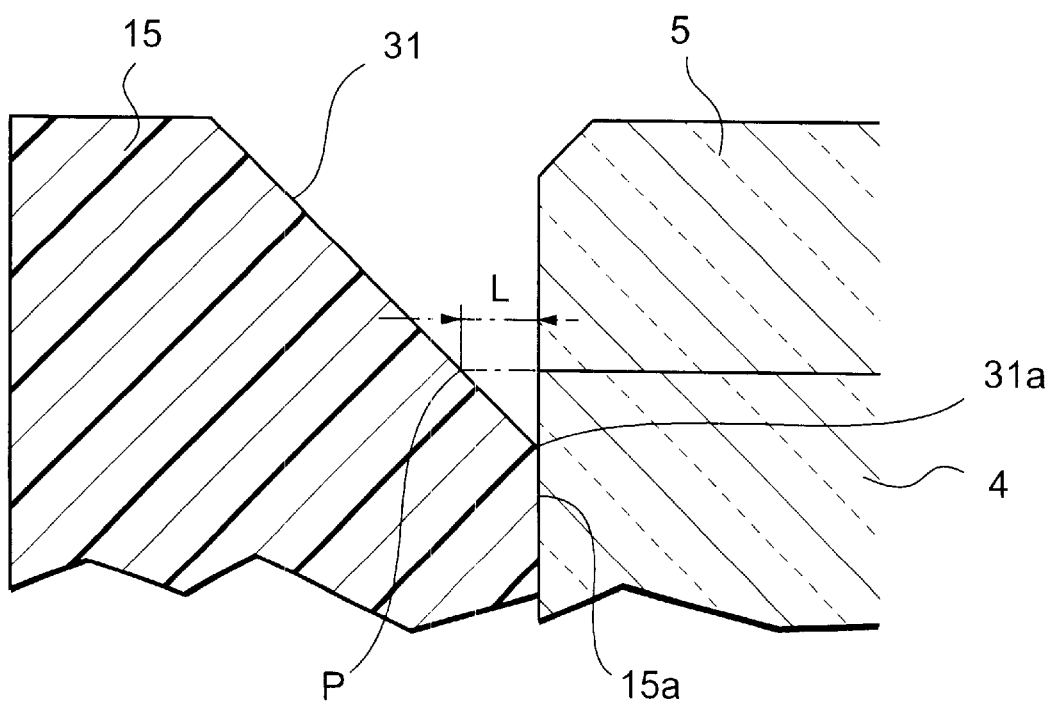
FIG. 8 is a partially enlarged cross section of FIG. 7.

As shown in FIG. 8, an intersecting point P between a line horizontally extended from the boundary of the substrate members 4 and 5 of the liquid crystal panel 2 and the taper 31 is in a position horizontally apart in the outer side from the holding face 15a only by a predetermined dimension L.

Specifically, the taper 31 is inclined so that a gap of the predetermined dimension L is formed in the horizontal direction between the upper end of the substrate 4 and the taper 31 when the end face as a cut face of the TFT substrate 4 of the liquid crystal panel 2 comes into contact with the holding face 15a of the holding wall 15. The predetermined dimension L is set to about 0.5 mm in this case since the deviation amount between the TFT substrate 4 and the CF substrate 5 is about 0.3 mm at the maximum.

Figure 9:
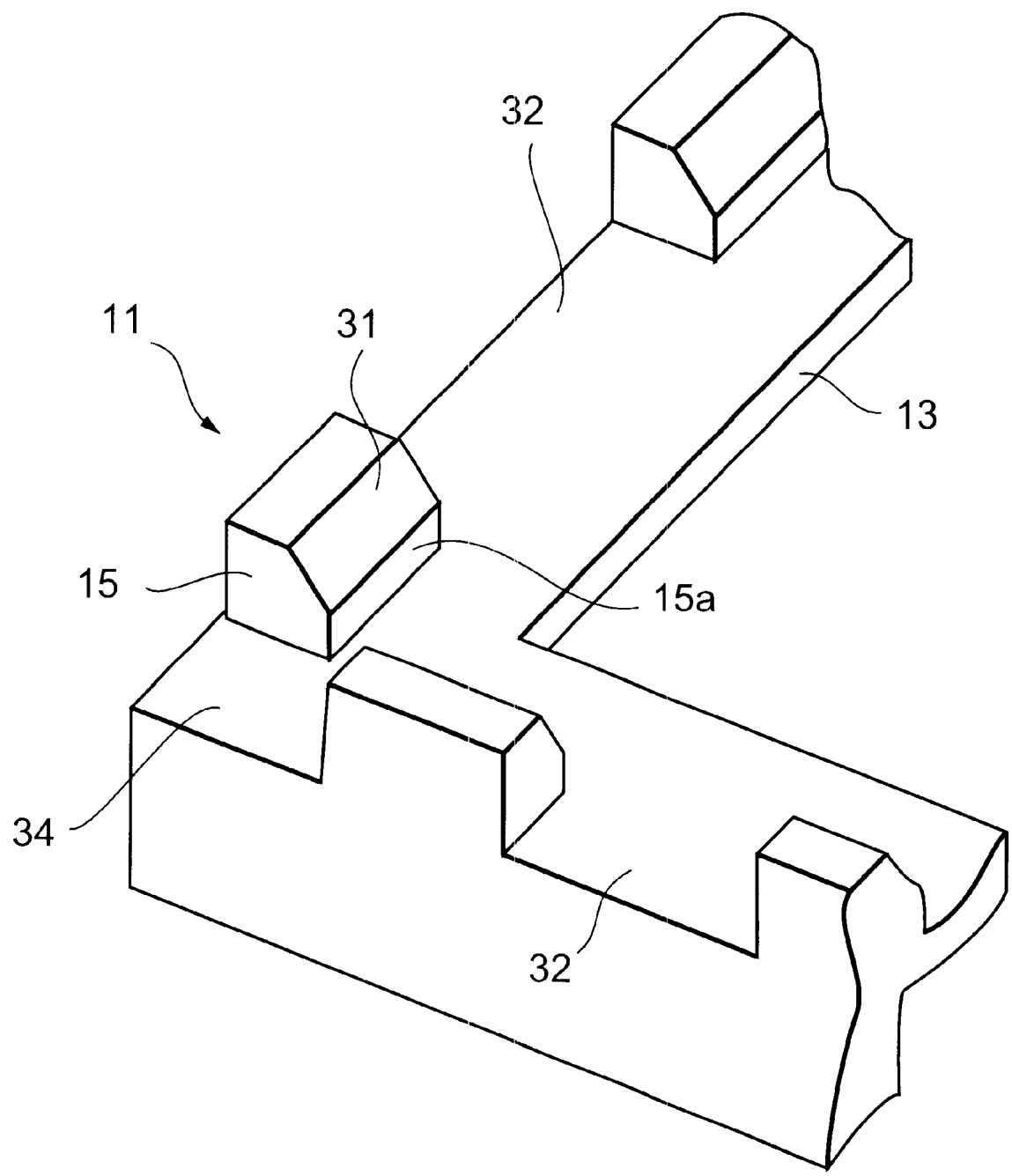
FIG. 9 is a partial perspective view of a holding frame according to the invention.

As shown in FIGS. 6 and 9, a plurality of notches 32 is formed at intervals in the circumferential direction in the holding walls 15 of the holding frame 11.

The bottom of each of the notches 32 is positioned at the top face of the spacer 13 of the holding frame 11. That is, the bottom face of the notch 32 is flush with the top face of the spacer 13.

A plurality of notches 33 similar to the notches 32 are formed in the holding walls 15 for holding the end faces of the sides to which the printed circuit boards 23 are connected via the TCPs 24 of the liquid crystal panel 2, that is, sides in which the TCPs 24 are connected to the exposed electrodes formed on the TFT substrate 4. The TCPs 24 are fit in the notches 33.

At the corners of the holding frame 11, the notches 34 are formed on one side of the holding walls 15 which are orthogonal to each other, thereby preventing interference between the corners of the liquid crystal panel 2 and the holding walls 15.

By using the above-described inner holding frame 11, when the liquid crystal panel 2 is fit in the holding walls 15, the periphery of the liquid crystal panel 2 is smoothly guided along the tapers 31 of the holding walls 15. The liquid crystal panel 2 is therefore extremely easily fit and held on the inside of the holding walls 15.

Figure 10:
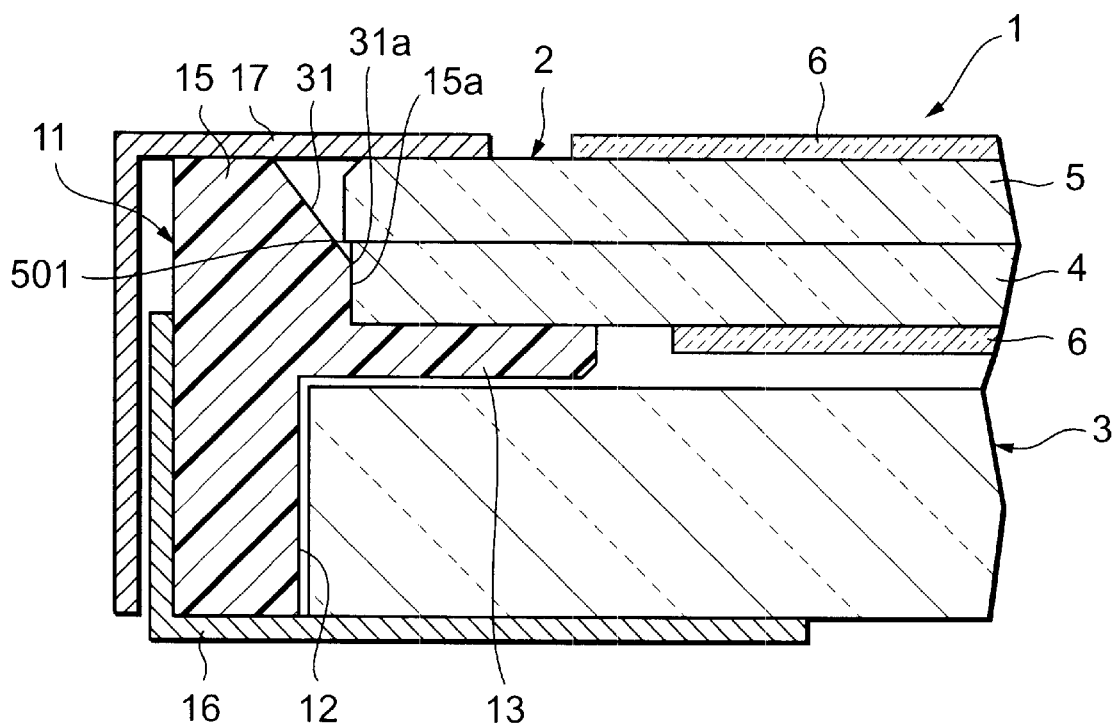
FIGS. 10 and 11 are partial cross sections for explaining a fit state of the liquid crystal panel to the holding frame in the invention.
Figure 11:
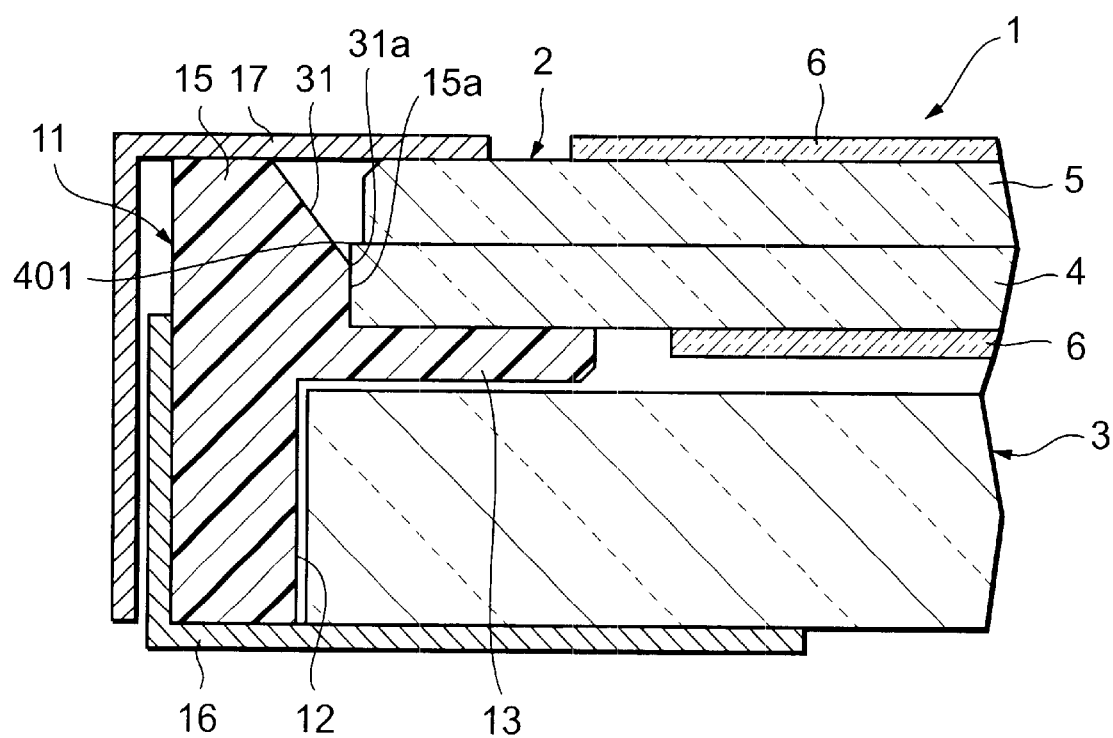

As shown in FIGS. 10 and 11, even when the end face as a cut face of the liquid crystal panel 2 housed on the inside of the holding walls 15 has the edge 401 or 501 formed by the deviation between the substrates 4 and 5, the upper end of the holding face 15a of the holding wall 15 is positioned lower than the boundary of the substrates 4 and 5 and can be in contact with only the end face of the lower substrate 4. Thus, the interference between the edge 401 or 501 and the holding wall 15 can be prevented.

Particularly, as shown in FIG. 10, the taper 31 is inclined so that even if the upper substrate 5 is projected to the outer side and deviated, when the end face of the lower substrate 4 of the liquid crystal panel 2 comes into contact with the holding face 15a of the holding wall 15, a gap of the predetermined dimension L of about 0.5 mm is formed in the horizontal direction between the upper end of the substrate 4 and the taper 31. Since the deviation between the substrates 4 and 5 constructing the liquid crystal panel 2 is about 0.3 mm at the maximum, the edge 501 of the protruded upper substrate 5 does not interfere with the taper 31.

As described above, according to the liquid crystal display device of the embodiment, the holding face 15a which can be in contact with only the end face of the substrate 4 is formed, on the side of the lower one of the substrates 4 and 5, that is, the substrate 4, in the holding wall 15 surrounding the liquid crystal panel 2. Consequently, the inconvenience can be certainly prevented such that a dust occurs when the edge at the boundary of the substrates 4 and 5 of the liquid crystal panel 2 comes into contact with the holding wall 15 on or after the attachment of the liquid crystal panel 2 and thereby cuts the holding wall 15, the dust enters between the liquid crystal panel 2 and the light guide plate 3 and it causes a problem in display on the screen.

When the liquid crystal panel 2 is fit and held in the holding frame 11, the liquid crystal panel 2 is smoothly guided along the tapers 31 formed in the holding walls 15 and held by the holding walls 15. The work of fitting the liquid crystal panel 2 to the holding frame 11 can be therefore facilitated.

Furthermore, since the end faces of the liquid crystal panel 2 fit in the holding frame 11 can be held by the notches 32 formed in the holding walls 15, the detaching work of the liquid crystal panel 2 at the time of test, maintenance or replacement of the liquid crystal panel 2 can be facilitated.

Moreover, since the notches 34 are formed at the corners of the holding walls 15, the corners of the liquid crystal panel 2 can be prevented from interfering the holding walls 15. Thus, the inconvenience caused by the interference of the corners of the liquid crystal panel 2 with the holding walls 15 can be certainly prevented.

Although the tapers 31 are formed in all of the holding walls 15 of the holding frame 11 in the embodiment, it is sufficient to form the tapers 31 at least in the holding walls 15 for holding the cut faces of the sides except for the sides having the electrodes of the liquid crystal panel 2.

Figure 12:
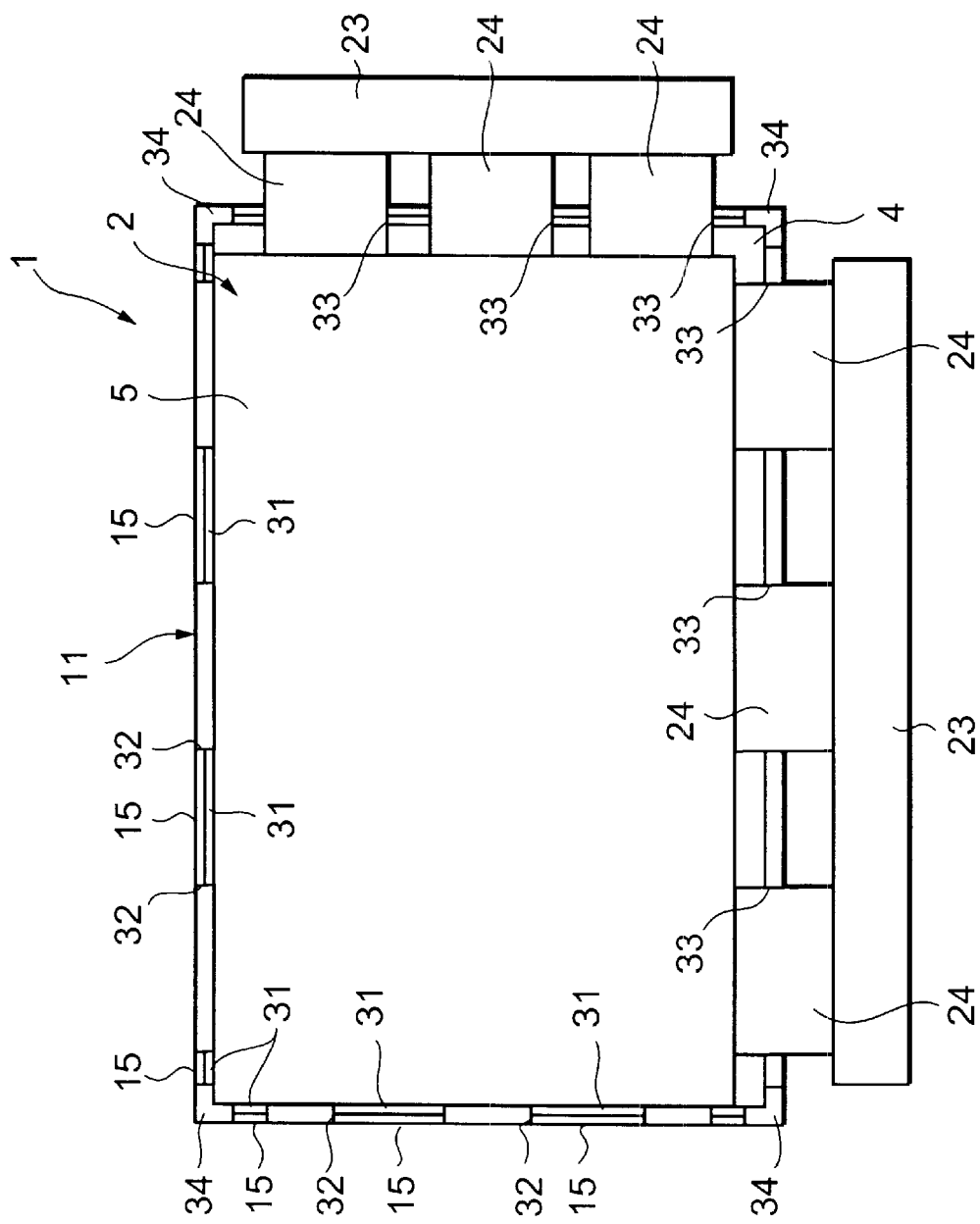
FIG. 12 is a plan view of a liquid crystal display device according to another embodiment of the invention.

FIG. 12 shows the holding frame 11 in which the tapers 31 are formed only in the holding walls 15 for holding three end faces except for one side in the longitudinal direction having the electrodes of the liquid crystal panel 2.

In the case of the holding frame 11, while performing positioning by making the end face of one side in the longitudinal direction having the electrodes of the liquid crystal panel 2 come contact with the holding wall 15 in which no taper 31 is formed, the liquid crystal panel 2 is fit in the holding walls 15. In such a manner, the end faces except for the end face in contact with the holding wall are guided along the tapers 31 formed in the holding walls 15, so that the liquid crystal panel 2 is smoothly fit in the holding frame 11.

In the case of the holding frame 11, particularly, the angle of each of the tapers 31 of the holding walls 15 for holding end faces on both sides of the end face which is in contact with the holding wall 15 is set to be small, the liquid crystal panel 2 can be more smoothly fit.

When the holding walls 15 are provided in positions to hold the corners of the liquid crystal panel 2, the liquid crystal panel 2 can be certainly held and maintained in a state where it is fit in the holding frame 11.

As described above, when the invention is applied to the liquid crystal display device, the following advantages can be obtained.

Since the holding face which can come into contact with only the end face of one of the substrates is formed in one of the substrates with respect to the border of the substrates, the inconvenience such that a dust occurs when the edge at the boundary of the substrates of the liquid crystal panel comes into contact with the holding wall on or after the attachment of the liquid crystal panel and the holding wall is cut, the dust enters between the liquid crystal panel and the light guide plate and it causes a problem in display on the screen can be certainly prevented.

Since the holding face can come into contact with only the lower substrate with respect to the boundary of the substrates, the inconvenience such that the edge formed by a deviation between the upper and lower substrates interferes with and cuts the holding wall can be certainly prevented.

In the case of fitting the liquid crystal panel to the holding frame, the liquid crystal panel is smoothly guided along the tapers formed in the holding walls and fit in the holding frame. The work of fitting the liquid crystal panel to the holding frame can be therefore facilitated.

Since the end faces of the liquid crystal panel fit in the holding frame can be held by the notches formed in the holding walls, the detaching work of the liquid crystal panel at the time of test, maintenance or replacement of the liquid crystal panel can be facilitated.

The liquid crystal panel can be maintained in a state where its corners are held and the liquid crystal panel is fit by the holding walls.

Moreover, since the notches are formed at the corners of the holding walls, it can be certainly prevented that the corners of the liquid crystal panel interfere with the holding walls 15. Thus, the inconvenience caused by the interference of the corners of the liquid crystal panel with the holding walls can be prevented.

The invention is not limited to a liquid crystal display device. Obviously, it can be applied to other flat display devices each using a flat display panel such as an electroluminescens (EL) display device, a plasma display device, and the like.

What is claimed is:

1. A flat panel display device comprising:
   a flat display panel having a first substrate and a second substrate facing each other;
   a first holding frame for supporting said first substrate, said first holding frame having a first supporting portion contacting a peripheral area of a principal surface of said first substrate and a second supporting portion rising from said first supporting portion so as to be contacted with an end face of said first substrate such that a contact distance between an end of said second supporting portion defined by a taper and said first supporting portion is smaller than a thickness of said first substrate; and
   a second holding frame for supporting said second substrate.

2. A flat panel display device according to claim 1, wherein said second supporting portion has a protruding portion extending toward said second holding frame, and said taper is provided on an inner surface facing said end face of said first substrate such that a distance between said taper and said end face of said first substrate is gradually increased toward said second substrate.

3. A flat panel display device according to claim 2, wherein said second supporting portion comprises a plurality of notches.

4. A flat panel display device according to claim 1, wherein said display panel is a liquid crystal display.

5. A flat panel display device according to claim 4, further comprising a third holding frame for supporting a light guide plate as a backlight member such that said light guide plate is sandwiched between said third holding frame and said first supporting portion of said first holding frame.

6. A flat panel display device according to claim 1, wherein the area of said first substrate is larger than that of said second substrate.

7. A flat panel display device according to claim 1, wherein a ridgeline formed between said end face and said principal surface of said first substrate is chamfered off.

8. A flat panel display device according to claim 2, wherein said first supporting portion is selectively provided at a corner of said first holding frame so that said first supporting portion is apart from a corner of said first substrate.

9. A flat panel display device according to claim 1, wherein at least on one side of the display panel, end faces of said first substrate and said second substrate are substantially flush with each other.

10. A flat panel display device according to claim 4, wherein said first substrate is provided with an array of thin film transistors and said second substrate is provided with a color filter.

11. A flat panel display device comprising:
- a flat display panel having a first substrate and a second substrate facing each other;
- a first holding frame for supporting said first substrate, said first holding frame having a first supporting portion contacting a peripheral area of a principal surface of said first substrate and a second supporting portion rising from said first supporting portion so as to be contacted with an end face of said first substrate such that a contact distance between an end of said second supporting portion defined by a taper and said first supporting portion is smaller than a thickness of said first substrate; and
- a second holding frame for supporting said second substrate, and
- wherein said first supporting portion is provided at a corner of said first holding frame so that said first supporting portion is apart from a corner of said first substrate.

12. The flat panel display device according to claim 11, wherein said second supporting portion includes at least two portions and is provided on said first supporting portion.

13. The flat panel display device according to claim 12, wherein said at least two portions include first and second portions with a notch therebetween.

14. A flat panel display device comprising:
- a flat display panel having a first substrate and a second substrate facing each other;
- a first holding frame for supporting said first substrate, said first holding frame having a first supporting portion contacting a peripheral area of a principal surface of said first substrate and a second supporting portion rising from said first supporting portion so as to be contacted with an end face of said first substrate such that a contact distance between an end of said second supporting portion defined by a taper and said first supporting portion is smaller than a thickness of said first substrate; and
- a second holding frame for supporting said second substrate, and
- wherein said second supporting portion includes at least two portions and is provided on said first supporting portion.

15. The flat panel display device according to claim 14, wherein said at least two portions include first and second portions with a notch therebetween.

* * * * *